(12) United States Patent
Edholm et al.

(10) Patent No.: US 8,899,006 B2
(45) Date of Patent: Dec. 2, 2014

(54) WALK BEHIND GARDEN TOOL CHASSIS

(75) Inventors: Fredrik Edholm, Jönköping (SE); Jasmin Insanic, Jönköping (SE); Jörgen Johansson, Jönköping (SE); Magnus Henriksson, Jönköping (SE); Jonas Tibbelin, Huskvarna (SE)

(73) Assignee: Husqvarna AB, Huskvarna (SE)

( * ) Notice: Subject to any disclaimer, the term of this patent is extended or adjusted under 35 U.S.C. 154(b) by 0 days.

(21) Appl. No.: 14/128,151

(22) PCT Filed: Jun. 22, 2011

(86) PCT No.: PCT/SE2011/050826
§ 371 (c)(1),
(2), (4) Date: Dec. 20, 2013

(87) PCT Pub. No.: WO2012/177197
PCT Pub. Date: Dec. 27, 2012

(65) Prior Publication Data
US 2014/0196426 A1 Jul. 17, 2014

(51) Int. Cl.
*A01D 67/00* (2006.01)
*A01D 34/00* (2006.01)

(52) U.S. Cl.
CPC ............... *A01D 34/00* (2013.01); *A01D 67/00* (2013.01)
USPC .......................................... 56/320.1; 172/42

(58) Field of Classification Search
USPC .......... 56/1, 2, 320.1, DIG. 10, 320.2; 172/42
See application file for complete search history.

(56) References Cited

U.S. PATENT DOCUMENTS

| 2,532,230 | A | * | 11/1950 | Hupp | 56/15.7 |
| 2,688,907 | A | * | 9/1954 | Joy | 172/42 |
| 3,168,148 | A | * | 2/1965 | Marcoux | 172/42 |
| 3,330,371 | A | | 7/1967 | Seaman | |
| 3,970,272 | A | * | 7/1976 | Kaesgen | 248/611 |
| 4,015,407 | A | | 4/1977 | Bacon | |

(Continued)

FOREIGN PATENT DOCUMENTS

| DE | 2809654 A1 | 9/1979 |
| EP | 1613143 B1 | 1/2006 |
| WO | 0056137 A1 | 9/2000 |
| WO | 2004107845 A1 | 12/2004 |

OTHER PUBLICATIONS

International Search Report and Written Opinion of PCT/SE2011/050826 mailed Feb. 15, 2012.
Chapter I International Preliminary Report on Patentability of PCT/SE2011/050826 mailed Dec. 23, 2013.

*Primary Examiner* — Alicia Torres
(74) *Attorney, Agent, or Firm* — Nelson Mullins Riley & Scarborough LLP

(57) ABSTRACT

A walk behind garden tool chassis including a first chassis part and a second chassis part. The first chassis part is arranged to receive an engine of the garden tool, and to receive a first wheel assembly of the garden tool. The second chassis part is arranged to receive a handle assembly of the garden tool, and to receive a second wheel assembly of the garden tool. The first and second chassis parts are interconnected by vibration dampers.

20 Claims, 3 Drawing Sheets

(56) References Cited

U.S. PATENT DOCUMENTS

| | | |
|---|---|---|
| 4,813,218 A | 3/1989 | Claesson |
| 5,862,654 A | 1/1999 | Thier et al. |
| 7,762,739 B2 * | 7/2010 | Blanchard .................. 403/322.2 |
| 2006/0156705 A1 | 7/2006 | Lindell |

* cited by examiner

WALK BEHIND GARDEN TOOL CHASSIS

FIELD OF THE INVENTION

Embodiments herein relate to motor-driven walk behind garden tools, and especially to a chassis of a motor-driven walk behind garden tool.

BACKGROUND

During operation of a motor driven walk-behind garden tool, such as a walk-behind lawn mower, vibrations originating from the engine and an operating unit, such as a cutting unit, might be transmitted to the handle assembly of the tool, and further to the hands of an operator. It is well known that exposing an operator to such vibrations can be injurious, and cause problems such as the white finger syndrome. Moreover, components of the garden tool may be damaged and/or come loose.

So far, two main categories of solutions are used in order to minimize the amount of vibrations reaching the hands of the operator.

The first category includes garden tools having anti-vibrated handles. EP1613143B1 discloses a lawn mower in which the handle assembly is provided with vibration damping means. A major drawback with solutions based on anti-vibrated handles is that the operator might experience that the handle feels non-rigid and that it becomes more difficult to manoeuvre the garden tool.

The second category of solutions has resulted in garden tools having anti-vibrated engines. U.S. Pat. No. 4,813,218 discloses a lawn mower in which damping means are provided between the engine and a cover portion of the lawn mower. A drawback with this solution is that the vibration levels of the engine might result in worn out or damaged engine components. However, a remaining problem is that the engine in this case is subjected to high vibration levels, which in turn may result in motor wear and a reduced motor life. In order to reduce the vibration levels in the engine, EP1631141B1 proposes a lawn mower in which the engine is rigidly connected with the cover portion, whereas damping means are provided between the cover portion and a wheel frame of the lawn mower. According to this solution, the vibration levels of the engine will be reduced by the mass of the cover portion, counteracting the movements of the engine. However, the vibration levels of the engine will still be problematic. Moreover, using a grass collector will be troublesome when the lawn mower is designed according to EP1631141B1.

SUMMARY OF THE INVENTION

In view of the above, it is an objective of the present invention to solve or at least reduce the problems discussed above. In particular, the objective is to provide an improved walk behind garden tool chassis with reduced vibration levels, in a handle assembly connected to the chassis as well as in other parts of the garden tool. It is also an objective to provide a walk behind garden tool chassis which implies that the garden tool feels rigid and solid. It is also an objective to provide a walk behind garden tool chassis resulting in reduced vibration levels, which chassis is easy to manufacture at a low cost.

According to a first aspect of the solution, at least one of the objectives is achieved according to walk behind garden tool chassis as described in claim 1. The walk behind garden tool chassis comprises a first chassis part and a second chassis part. The first chassis part is arranged to receive an engine of the garden tool, and to receive a first wheel assembly of the garden tool. The second chassis part is arranged to receive a handle assembly of the garden tool, and to receive a second wheel assembly of the garden tool. The first and second chassis parts are interconnected by means of vibration damping means.

Thereby, an improved vibration damping is achieved. When the engine operates, vibrations will be propagated within the first chassis part and further into the ground, since the first chassis part during use of the lawn mower is connected to the ground by means of the wheels. Vibrations propagated into the ground will be absorbed by the ground. Since vibration dampers are arranged between the first chassis part and the second chassis part, vibrations in the first chassis part can only be transmitted to the second chassis part via the vibration dampers. In this way the vibrations from the first chassis part to the second chassis part are reduced, and high vibration levels in the handle assembly are avoided. Since the second chassis part is also connected to the ground, by means of the rear wheel assembly, vibrations reaching the second chassis part will be further damped since vibrations may propagate into the ground.

According to an embodiment the second chassis part defines a cover portion, arranged to cover a working unit of the walk behind garden tool; and a handle assembly receiving portion arranged to receive the handle assembly. According to yet another embodiment the cover portion and the handle assembly receiving portion are rigidly interconnected. Thereby, a rigid and solid feel in the handle is achieved.

According to another embodiment, the handle assembly is rigidly connected to the handle assembly receiving portion. Thereby, a rigid and solid feel in the handle is achieved.

According to an embodiment, the vibration damping means comprise front vibration damping means and rear vibration damping means.

According to an embodiment, the front vibration damping means are arranged between a front portion of the second chassis part and a front portion of the first chassis part.

According to an embodiment the front vibration damping means comprise a material chosen from the group comprising rubber, synthetic rubber or polyurethane. Thereby some of the kinetic energy from the vibrations is transformed into thermal energy in the vibration damping means.

According to an embodiment there is a plurality of front vibration damping means According to an embodiment, the rear vibration damping means are arranged between the cover portion of the second chassis part and a rear portion of the first chassis part. Positioning the rear vibration damping means at a distance from the front vibration damping means may be profitable to the vibration damping effect achieved.

According to an embodiment the rear vibration damping means comprise a material chosen from the group comprising rubber, synthetic rubber or polyurethane. Thereby some of the kinetic energy from the vibrations is transformed into thermal energy in the vibration damping means.

According to an embodiment there is a plurality of rear vibration damping means.

According to a second aspect of the solution, a walk behind garden tool comprising a chassis according to any of the previous claims is provided.

According to an embodiment the garden tool is a lawn mower.

According to an embodiment of the second aspect of the solution, the weight of the second chassis part, rear suspension and handle assembly is at least as large as the weight of first chassis part the front suspension and the engine. According another embodiment of the second aspect weight of the first chassis part, front suspension and engine is essentially equal to the weight of the second chassis part, rear suspension and handle assembly. Such a weight distribution may be advantageous in that vibrations may be further reduced thanks to the uniformly distributed weight between the parts interconnected by damping elements.

Additional features and advantages of the present invention will be evident from the following description of special embodiments of the invention with reference to the accompanying drawings.

DEFINITIONS

As used herein, the following terms have the following meanings:

A walk behind garden tool comprises a body, a handle assembly and a plurality of wheels. In the following description, the walk behind garden tool is embodied as a walk behind lawn-mower.

The body of a motor driven walk-behind garden tool comprises an engine, a working tool (such as a cutting unit) which is driven by the engine, and a chassis.

Herein a chassis denotes a supporting frame to which the engine, the working tool, the handle assembly and the wheels of the garden tool are attached. The wheels are connected to the chassis by means of a suspension arrangement.

A front suspension or front wheel assembly comprises one or several front wheels of the garden tool, and means (such as a front axle) for connecting the wheel(s) to the chassis, A rear suspension or rear wheel assembly comprises one or several rear wheels of the garden tool, and means (such as a rear axle) for connecting the wheel(s) to the chassis, A cover portion is a portion of the chassis which is arranged to protect and cover a working unit of the garden tool, such as a cutting blade of a lawn mower. Due to its shape, the word helix is sometimes used to denote this portion of the chassis. The cutting blade rotates in a cutting chamber defined by the helix/cover portion. A

DESCRIPTION OF PREFERRED EMBODIMENTS

Figure 1:
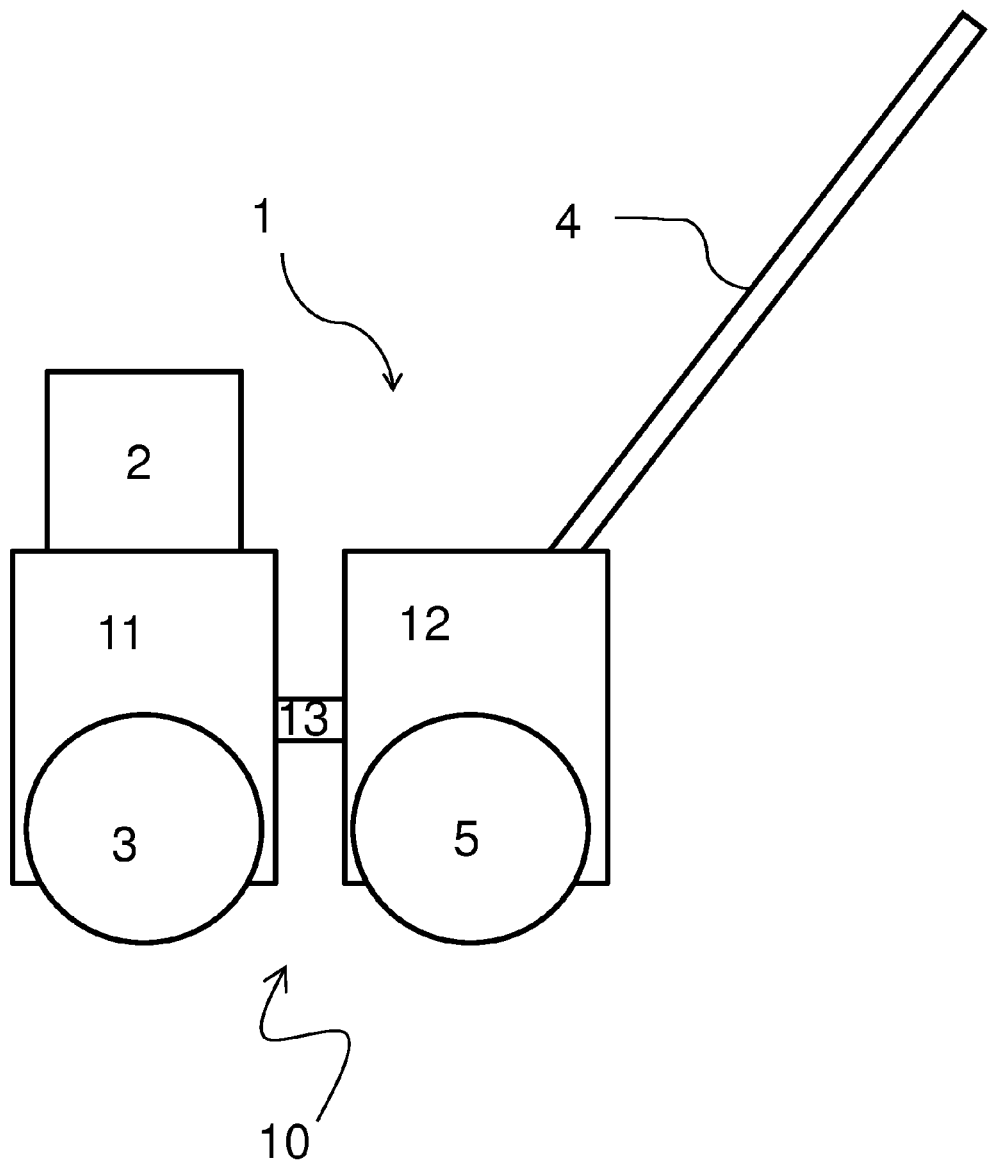
FIG. 1 is a schematic view of a lawn mower according to embodiments herein.

In FIG. 1a lawn mower having a chassis according to embodiments herein is schematically shown, for illustration of the main idea of the invention.

The lawn mower chassis 10 is divided into a first chassis part 11 and a second chassis part 12. Vibration dampers 13 are provided between the two parts, in order to reduce transmission of vibrations between the two parts 11, 12.

The lawn mower engine is connected to the first chassis part 11 e.g. by means of bolts.

A front suspension comprises a pair of front wheels 3 and an arrangement for attaching the wheels to the first chassis part 11, such as a wheel axle. The front suspension can be configured in various ways and is not further disclosed herein.

Correspondingly, a rear suspension comprises a pair of rear wheels 5 and an arrangement for attaching the wheels to the second chassis part 12, such as a wheel axle. The rear suspension can be configured in various ways and is not further disclosed herein.

The handle assembly 4 is also connected to the second chassis part 12. The connection between the handle assembly 4 and the second chassis part 12 may be configured in various ways.

Vibration dampers 13 are provided between the first 11 and second 12 chassis parts.

Figure 2:
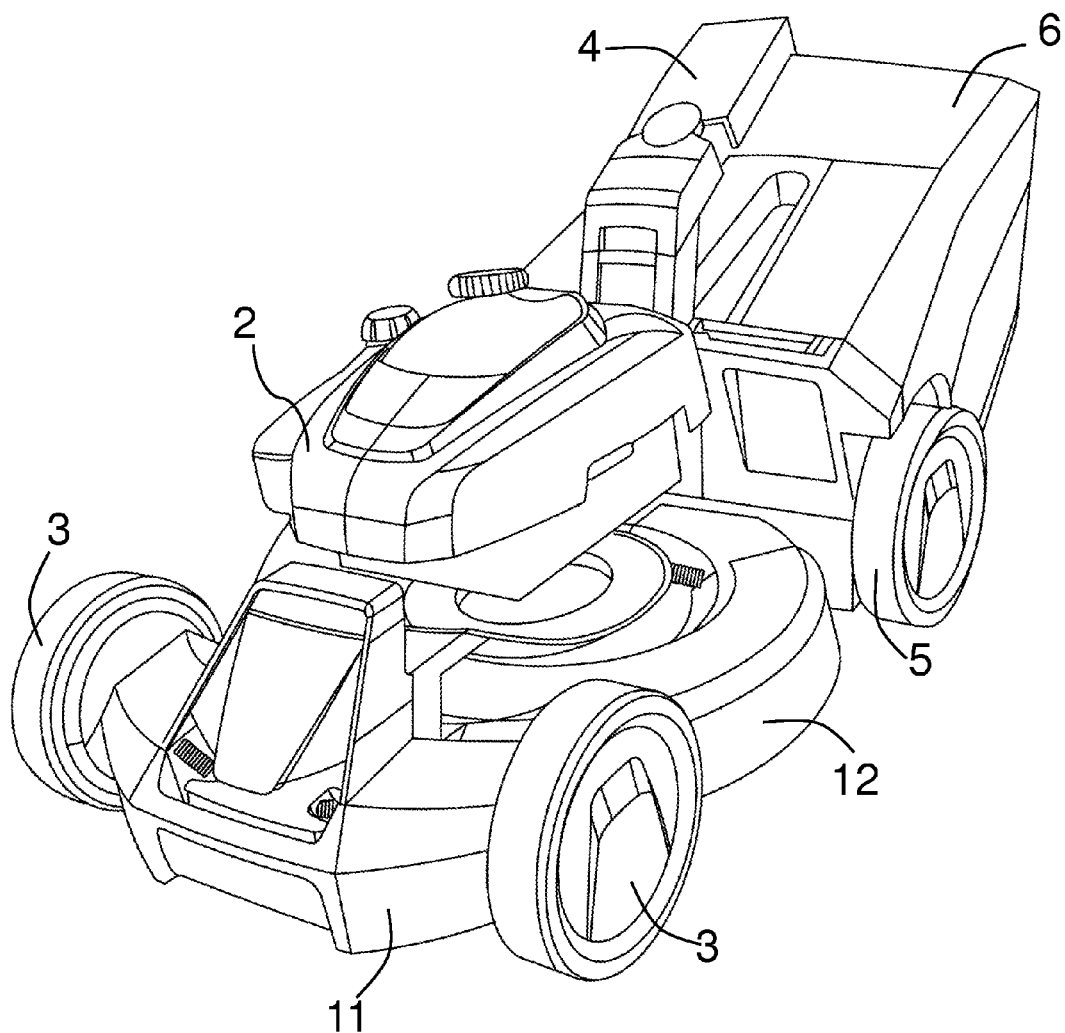
FIG. 2 is a partial perspective view of a lawn mower having a chassis according to embodiments herein.

In FIG. 2 an exemplary embodiment of a lawn mower according to embodiments herein is shown in more detail. Only a portion of the handle assembly which is proximal to the body of the lawn mower is shown in FIG. 2, whereas a portion of the handle assembly 4 which is distal to the body of the lawn mower is omitted in FIG. 2. The exemplary lawn mower shown in FIG. 2 is equipped with a grass collector 6.

Figure 3:
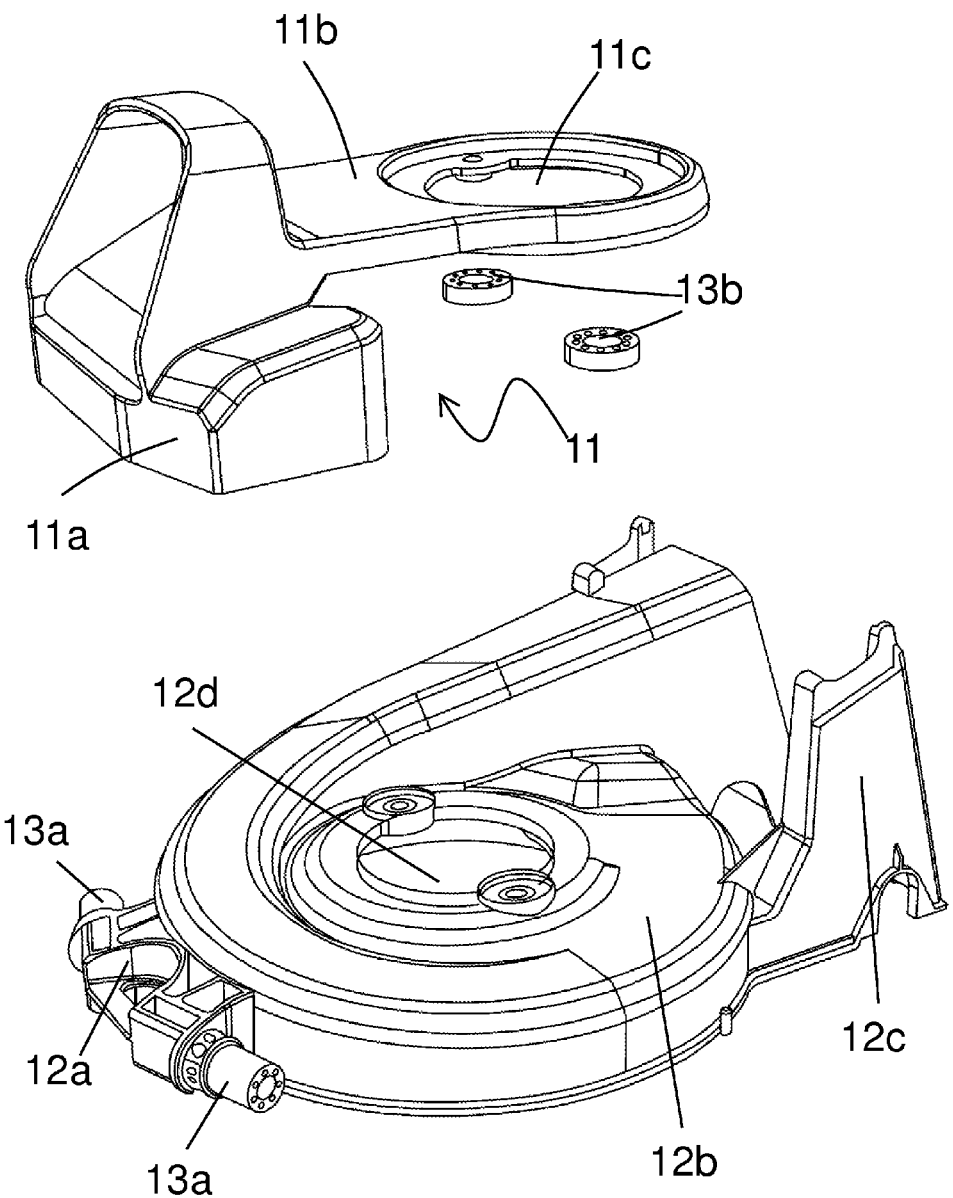
FIG. 3 is perspective exploded view of a lawn mower chassis according to embodiments herein.

In FIG. 3, parts of a chassis 10 according to embodiments herein are shown in a dismantled state.

First Chassis Part

In the configuration shown in FIGS. 2 and 3, the first chassis part 11 has a front portion 11a and a rear portion 11b. The front portion 11a and the rear portion 11b of the first chassis part might be integrally formed, as shown in FIGS. 2 and 3.

The rear portion 11b is arranged to receive the engine 2, i.e. by means of bolting the engine to the rear portion 11b. An engine shaft (not shown) is arranged to extend through an opening 11c in the rear portion 11b of the first chassis part 11. A rotary cutting blade (not shown) is arranged to be connected to the engine shaft.

In the embodiment shown in FIGS. 2 and 3 the rear portion 11b of the first chassis part 11 is sandwiched between the engine 2 and the second chassis part 12.

The front portion 11a of the first chassis part is arranged to receive the front wheels 3 of the lawn mower. The front wheels and the front axle portion 11a form part of a front suspension. As shown in FIG. 3, the front portion can be configured as a protective hood, arranged to partly cover the front wheel axle, and the front portion 12a of the second chassis part 12.

The portions of the first chassis part 11 may be integrally formed, as shown in FIG. 3. The first chassis part may also be constructed from separate parts. The first chassis part 11 may e.g. be made of plastic, sheet metal or aluminum.

Second Chassis Part

According to the embodiment shown in FIGS. 2 and 3, the second chassis part 12 comprises a front portion 12a, a central portion 12b and a rear portion 12c. According to some embodiments, the three portions are integrally formed. The second chassis part 12 may also be constructed from separate parts, assembled in an appropriate manner. The first chassis part 11 may e.g. be made of plastic, sheet metal or aluminum.

In the embodiment depicted in FIGS. 2 and 3, the central portion 12b defines a hood shaped protective cover portion 12b for a rotary cutting blade of the cutting unit. It has an opening 12d arranged to be aligned with the opening 11c of the first chassis part 11, so as to allow the engine shaft to pass through the two openings 11c, 12d. The cover portion 12b defines a cutting chamber in which a cutting blade may rotate.

The rear portion 12c is arranged to receive a handle assembly of the lawn mower and the rear wheel suspension. A chute for discharging grass and debris from the cutting chamber may also be formed in the rear portion 12c. A grass collector 6 may be releasably attached to the rear portion 12c. If the lawn mower is a mulching mower only, no grass collector or chute is needed.

According to some embodiments, the front portion 12a of the second chassis part 12 protrudes from the cover portion 12b in a forward direction.

Connection between Chassis Parts and Vibration Damping

According to some embodiments, the first chassis part is connected to the second chassis part by means of connection means of a front contact assembly and a rear contact assembly. The front contact assembly may be arranged to interconnect the front portion 12a of the second chassis 12 part and the front portion 11a of the first chassis part 11. The rear contact assembly may be arranged to interconnect the cover portion 12b of the second chassis part and the rear portion 11b of the first chassis part 11.

According to some embodiments, the front contact assembly comprises two front connecting means. Each front connecting means may comprise a bolt (not shown) and a vibration damping element 13a. The bolt may extend through a through hole in the vibration damping element 13a. The bolt delimits the relative movement between the first and the second chassis part.

The front vibration damping elements 13a may be implemented as rubber bushings. They are arranged to provide an interface between the first and second chassis parts, damping the energy transmitted through the bushing. A certain amount of relative movement between the parts may be allowed. A bolt extending through the bushing may delimit the allowed relative movement.

According to some embodiments, front vibration damping elements 13a are made of rubber, synthetic rubber or polyurethane. Such vibration damping elements are advantageous in that the material may convert kinetic energy to thermal energy within the damping element.

The damping elements may also be constructed from other kinds of materials. They may e.g. be configured as springs.

According to some embodiments, the rear contact assembly comprises two rear connecting means. Each rear connecting means may comprise a bolt (not shown) and a vibration damping element 13b. The bolt may extend through a through hole in the vibration damping element 13b. The bolt delimits the relative movement between the first and the second chassis part.

The rear vibration damping elements 13b may be implemented as rubber bushings. They are arranged to provide an interface between the first and second chassis parts, damping the energy transmitted through the bushing. A certain amount of relative movement between the parts may be allowed. A bolt extending through the bushing may delimit the allowed relative movement.

According to some embodiments, the rear vibration damping elements 13b are made of rubber, synthetic rubber or polyurethane. Such vibration damping elements are advantageous in that the material may convert kinetic energy to thermal energy within the damping element.

The damping elements may also be constructed from other kinds of materials. They may e.g. be configured as springs.

When the engine 2 operates, vibrations will be propagated within the first chassis part 11 and further into the ground, since the first chassis part 11 during use of the lawn mower is connected to the ground by means of the wheels. Vibrations propagated into the ground will be absorbed by the ground. Since the first chassis part is connected to the second chassis part, some vibrations will probably be transmitted into the second chassis part as well. However, since vibration dampers 13 are arranged between the first chassis part and the second chassis part, vibrations in the first chassis part can only be transmitted to the second chassis part via the vibration dampers.

In this way the vibrations from the first chassis part to the second chassis part are reduced, and high vibration levels in the handle assembly are avoided.

Since the second chassis part is also connected to the ground, by means of the rear wheel assembly, vibrations reaching the second chassis part will be further damped since vibrations may propagate into the ground.

According to some embodiments, the weight of the second chassis part, rear suspension and handle assembly is at least as large as the weight of the first chassis part, front suspension and engine.

According to some embodiments, the weight of the first chassis part, front suspension and engine is essentially equal to the weight of the second chassis part, rear suspension and handle assembly. Such a weight distribution may be advantageous in that vibrations may be further reduced thanks to the uniformly distributed weight between the parts interconnected by damping elements.

In the drawings and specification, there have been disclosed preferred embodiments and examples of the invention and, although specific terms are employed, they are used in a generic and descriptive sense only and not for the purpose of limitation, the scope of the invention being set forth in the following claims.

The invention claimed is:

1. A walk behind garden tool chassis comprising:
a first chassis part; and
a second chassis part,
wherein the first chassis part is arranged to receive an engine of the garden tool, and to receive a first wheel assembly of the garden tool,
wherein the second chassis part is arranged to receive a handle assembly of the garden tool, and to receive a second wheel assembly of the garden tool, and
wherein the first and second chassis parts are interconnected by front vibration damping means and rear vibration damping means, and the front vibration damping means are arranged between a front portion of the second chassis part and a front portion of the first chassis part.

2. The walk behind garden tool chassis according to claim 1, wherein the second chassis part comprises:
a cover portion arranged to cover a working unit of the walk behind garden tool; and
a handle assembly receiving portion arranged to receive the handle assembly.

3. The walk behind garden tool chassis according to claim 2, wherein the cover portion and the handle assembly receiving portion are rigidly interconnected.

4. The walk behind garden tool chassis according to claim 2, wherein the handle assembly is rigidly connected to the handle assembly receiving portion.

5. The walk behind garden tool chassis according to claim 1, wherein the front vibration damping means comprise a material comprising rubber, synthetic rubber, or polyurethane.

6. The walk behind garden tool chassis according to claim 1, wherein there is a plurality of front vibration damping means.

7. The walk behind garden tool chassis according to claim 2, wherein the rear vibration damping means are arranged between the cover portion of the second chassis part and a rear portion of the first chassis part.

8. The walk behind garden tool chassis according to claim 1, wherein the rear vibration damping means comprise a material comprising rubber, synthetic rubber, or polyurethane.

9. The walk behind garden tool chassis according to claim 1, wherein there is a plurality of rear vibration damping means.

10. A walk behind garden tool comprising a chassis, the chassis comprising:
   a first chassis part; and
   a second chassis part,
   wherein the first chassis part is arranged to receive an engine of the garden tool, and to receive a first wheel assembly of the garden tool,
   wherein the second chassis part is arranged to receive a handle assembly of the garden tool, and to receive a second wheel assembly of the garden tool, and
   wherein the first and second chassis parts are interconnected by front vibration damping means and rear vibration damping means, and the front vibration damping means are arranged between a front portion of the second chassis part and a front portion of the first chassis part.

11. The walk behind garden tool according to claim 10, wherein a weight of the second chassis part, the second wheel assembly, and the handle assembly is equal to or greater than a weight of the first chassis part, the first wheel assembly, and the engine.

12. The walk behind garden tool according to claim 10, wherein the garden tool is a lawn mower.

13. The walk behind garden tool according to claim 10, wherein the second chassis part comprises a cover portion arranged to cover a working unit of the walk behind garden tool, and wherein the rear vibration damping means are arranged between the cover portion of the second chassis part and a rear portion of the first chassis part.

14. The walk behind garden tool according to claim 10, wherein the front vibration damping means comprise springs or bushings, and wherein the rear vibration damping means comprise springs or bushings.

15. The walk behind garden tool according to claim 10, wherein a rear portion of the first chassis part defines an opening that is aligned with an opening defined by the second chassis part so that an engine shaft passes through the aligned openings.

16. The walk behind garden tool according to claim 10, wherein a rear portion of the first chassis part is sandwiched between the engine and the second chassis part.

17. The walk behind garden tool according to claim 10, wherein the front vibration damping means comprise rubber bushings.

18. The walk behind garden tool chassis according to claim 1, wherein the front vibration damping means comprise springs or bushings, and wherein the rear vibration damping means comprise springs or bushings.

19. The walk behind garden tool chassis according to claim 1, wherein a rear portion of the first chassis part defines an opening that is aligned with an opening defined by the second chassis part so that an engine shaft passes through the aligned openings.

20. The walk behind garden tool chassis according to claim 1, wherein a rear portion of the first chassis part is sandwiched between the engine and the second chassis part.

* * * * *